United States Patent

[11] 3,540,683

[72] Inventor Curtis W. Foster
  North Hollywood, California
[21] Appl. No. 681,206
[22] Filed Nov. 7, 1967
[45] Patented Nov. 17, 1970
[73] Assignee Lockheed Aircraft Corporation
  Burbank, California

[54] DUAL AIR CHAMBERED SHOCK STRUT
  4 Claims, 4 Drawing Figs.
[52] U.S. Cl. ................................................ 244/104,
  188/100; 267/65
[51] Int. Cl. ....................................................... B64c 25/58
[50] Field of Search........................................... 244/104;
  188/100; 267/64, 65

[56] References Cited
UNITED STATES PATENTS
| | | | |
|---|---|---|---|
| 2,892,626 | 6/1959 | Scott et al. | 244/104X |
| 3,304,076 | 2/1967 | Doversberger | 267/64 |
| 3,304,077 | 2/1967 | Eaton et al. | 267/64 |
| 2,296,017 | 9/1942 | Bound et al. | 244/104 |
| 2,519,522 | 8/1950 | Wells | 244/104 |
| 3,393,883 | 7/1968 | Smith et al. | 244/104X |

FOREIGN PATENTS
| | | | |
|---|---|---|---|
| 819,164 | 7/1937 | France | 244/104 |
| 954,078 | 6/1949 | France | 244/104 |
| 1,012,604 | 12/1965 | Great Britain | 244/104 |

Primary Examiner—Milton Buchler
Assistant Examiner—Paul E. Sauberer
Attorney—George C. Sullivan ABSTRACT: A dual air chambered shock strut for aircraft, having telescoping members which cooperate to define dual pressure chambers capable of applying a reaction force against the aircraft load during takeoff and landing procedures.

INVENTOR.
CURTIS W. FOSTER
BY George C. Sullivan
Agent

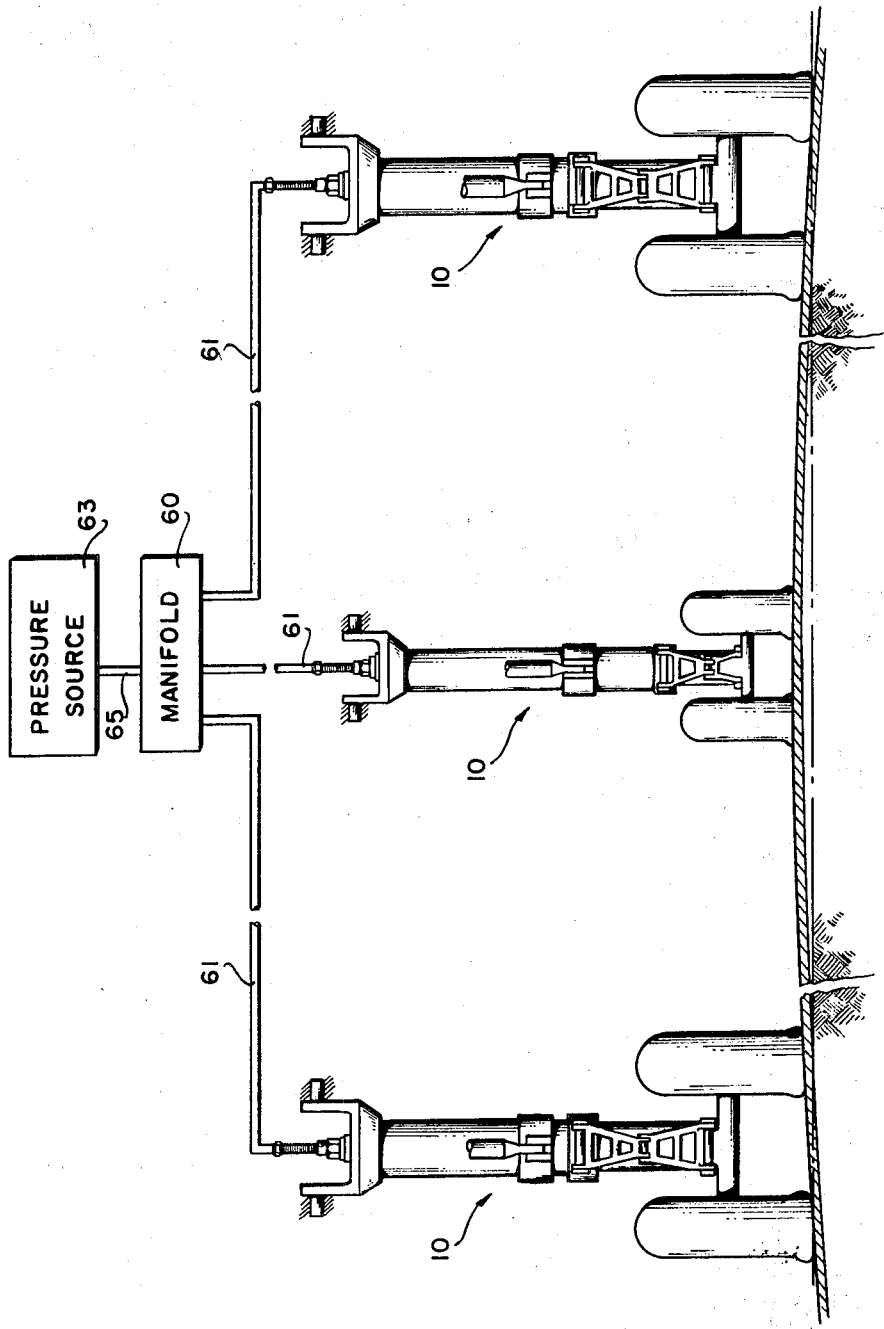
FIG._4
INVENTOR.
CURTIS W. FOSTER

DUAL AIR CHAMBERED SHOCK STRUT

BACKGROUND OF THE INVENTION AND DESCRIPTION OF THE PRIOR ART

This invention relates to shock struts for aircraft and particularly to means for improving both the landing and takeoff characteristics of the shock struts. Heretofore, shock struts commonly used have required a compromise between the breakaway force, i.e., that force required to initiate retraction of the strut from its fully extended position, for soft landings, and good riding characteristics during takeoff with a full load of fuel in the aircraft. The problems of such a compromise are especially acute in aircraft having a high takeoff-to-landing weight ratio.

The shock strut most commonly used incorporates a single air-oil chamber having a single gas pressure. As a consequence, if the air chamber is under a gas pressure which is sufficiently high to withstand the aircraft loads during takeoff, the air chamber is too hard to afford a soft landing, since the breakaway force is very high. Conversely, if the air chamber is under a low gas pressure, the shock strut has good landing qualities because of the low breakaway force requirements but poor taxiing characteristics because under such conditions the shock strut is very rigid and nonresponsive to the aircraft load.

Another shock strut commonly used is the liquid spring device. The main disadvantage with such a device is that it has linear spring load-stroke characteristics, as contracted with the standard air-oil type strut which has more preferable hyperbolic spring load-stroke characteristics. To compensate for this, some liquid spring devices utilize dual liquid pressure chambers in order to approximately simulate the hyperbolic spring load-stroke characteristics of the standard single air-oil chamber type strut. However, all of the disadvantages of the standard air-oil type strut discussed above also pertain to the dual chambered liquid spring device, since both types approximate each other.

SUMMARY OF THE INVENTION

A dual air chambered shock strut for an aircraft comprising an elongated hollow cylinder having an open end and a closed end, with a first piston extending into the cylinder through the open end thereof, and a floating piston axially movable in the cylinder, separating the cylinder interior into first and second pressure chambers, one of the pressure chambers having a gaseous material contained therein, thereby fulfilling a significant object of this invention, i.e., providing shock strut means which adequately protects the aircraft against excessive shock under all conditions of taxiing, takeoff and landing.

Another object of the invention is to provide soft landings of the aircraft by reducing the breakaway force of the landing gear.

Another object of the invention is to improve the aircraft ride when taxiing over bumps or holes in the runway.

Another object of this invention is to provide a shock strut that has a long shocking stroke and at the same time has a low fully extended pressure.

Various other objects and advantages will appear from the following description of one embodiment of the invention.

BRIEF DESCRIPTION OF THE DRAWINGS

FIG. 4 is a schematic view of the manifolded landing gear system.

DESCRIPTION OF THE INVENTION

Figure 1:
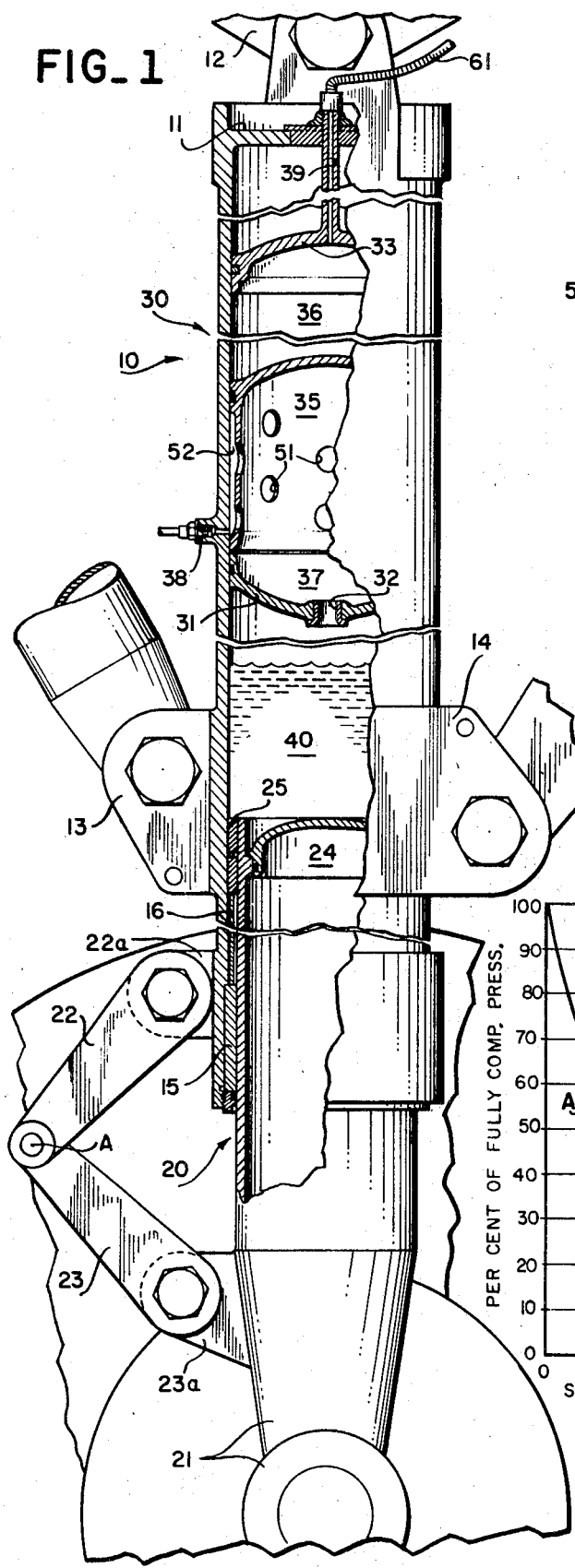
FIG. 1 is a sectional view of the shock strut in its fully extended position.

In the embodiment of the invention illustrated in FIG. 1, the device includes a hollow cylinder 10 adaptable for operation in a vertical position and having a closed end 11 adapted for connection to an aircraft structure by means of a lug 12 fixed to the closed end 11. A pair of lugs 13 and 14 are integral with and extend oppositely outward from approximately midway of the cylinder 10 as additional means used to connect the cylinder 10 to the aircraft structure.

Coaxially extending into the open end of the cylinder 10 is a piston or strut means 20. This strut is adapted for attachment to an aircraft wheel through a fork and axle system attached to and extending generally downward from the strut 20. A pair of links 22 and 23 which are pivotally connected to one another at point A, connect the strut 20 to the cylinder 10 through a pair of lugs 22a and 23a, respectively, and are used as one means to limit the extension of the strut 20. They also absorb any torque loads transferred from the strut 20 to the cylinder 10. Connected to the upper end of the strut 20 is a piston head 24. A retaining ring 25 is also fixedly mounted to the upper end of the strut 20. The bottom end of the cylinder 10 also has a retaining ring 15 attached thereto. An annular spacer 16 is mounted on the retaining ring 15 with the upper portion of the sleeve 16 adapted for engagement with the retaining ring 25 to limit the bottommost extension of the strut 20.

A shock strut pressure chamber, generally indicated at 30, includes a fixed lower end member 31 with an orifice 32 defined therein. The upper end of the chamber 30 is integrally connected to an end member 33. Axially movable within the cylinder 10 between end members 31 and 33 is a floating piston 35 which separates the pressure chamber 30 into an upper chamber 36 and a lower chamber 37. The lower chamber 37 communicates with a low pressure gas source by means of a conventional inlet connector 38 while the upper chamber 36 is placed in communication with a relatively higher pressure gas source through an inlet tube 39 extending from an extremity of the end member 33 and leading through the cylinder end 11. The tube 39 is appropriately retained in a nonmovable position with respect to the end 11. An oil reservoir 40 is defined between the piston head 24 and the end member in the cylinder 10 and is placed in communication with the chamber 37 through the presence of the orifice 32. The floating piston 35 is of dome-shaped configuration, having a plurality of orifices 51 which are provided for introduction of gas from the pressure source 38 to pressure chamber 37 when the piston 35 is abutted against the shoulders of the end member 31. The piston 35 also cooperates with the cylinder 10 to define an annular chamber 52 therebetween which also communicates via orifices 51 with the pressure chamber 37 thereby equalizing the pressure acting on the piston sidewall. This permits the piston 35 to slide freely within cylinder 10 with a high degree of stability.

In operation, during the normal shocking stroke, the strut 20 reciprocates within the cylinder 10 and is supported by the retaining ring 15 at the lower end of cylinder 10 and by the retaining ring 25 bearing against the interior of the cylinder 10. The annular spacer 16 maintains the rings 15 and 25 in a spaced relationship to afford a more stable support to resist any bending of the gear. The strut 20 initially moves upward forcing the oil located above the piston head 24 through the orifice 32, thereby dissipating the primary portion of the impact energy of the shocking stroke. The remaining portion of the impact energy is available to compress the air in chambers 36 and 37.

As stated above, the lower chamber 37 is maintained at a lower air pressure than is the upper air chamber 36. Therefore, under a normal shocking stroke, the floating piston 35 remains abutted against the shoulders of the end member 31, while the piston head 24 compresses the air in the lower chamber 37. However, if a higher reaction force is necessary, the pressure in the lower chamber 37 forces the floating piston 35 to break away from the shoulders of the end member 31 to further compress the air in the upper chamber 36.

During takeoff, when the aircraft is at full weight, to counteract such a load the air in both chambers 36 and 37 is compressed by the strut 20 and piston 35 to the degree necessary to balance the reaction force of the strut with the load of the aircraft. If during the takeoff taxiing the wheel hits a bump in the runway, the pressure chambers are compressed further with the strut absorbing the shock of the load.

Preliminary to landing, the strut is of course in its fully extended position. Upon touchdown the strut breaks away and immediately begins to retract, since the only initial force opposing the strut is the pressure force in the low pressure chamber 37. This low breakaway force insures a soft landing. Even though the aircraft may have a very hard touchdown, the high pressure chamber 36 takes up any of the excess load on the low pressure chamber 37. After touchdown and during the taxiing, the strut remains responsive to any runway bumps because the low pressure chamber 37 is able to absorb the shock load.

Therefore, as can be seen, the amount of shock occurring during takeoff or landing and ultimately transferred to the aircraft fuselage is thereby greatly reduces.

Figure 2:
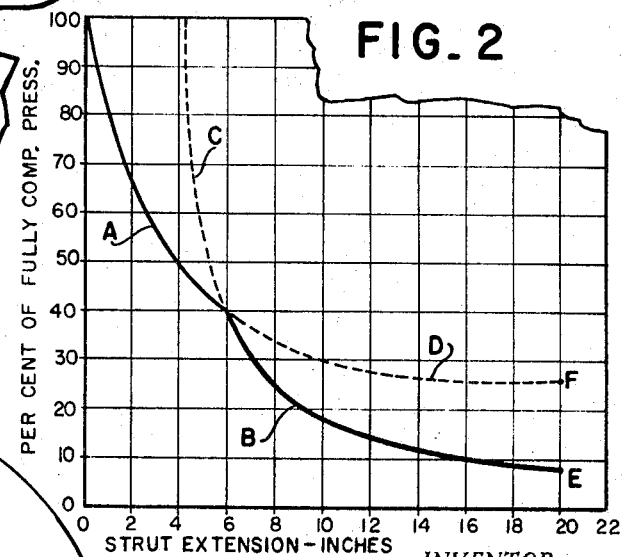
FIG. 2 is a graph of the shock strut pressure curve plotted against the strut extension.

FIG. 2 shows the pressure curve of the dual chamber shock strut represented by solid lines A and B. The curve is plotted by percent of fully compressed pressure against the strut extension in inches. As can be seen by the graph, the total stroke of the embodied strut is shown as 20 inches, for illustrative purposes only. Line A represents that part of the curve where both the high and low pressure air chambers are being compressed. This normally occurs during takeoff when the aircraft has a full load of fuel and is at its heaviest, and at which time the strut is extended only a short distance. Line B represents that part of the curve wherein only the lower air chamber 37 is being compressed. This normally occurs during landing, at which time the strut is in its fully extended position. Point E represents the breakaway force needed to initiate strut retraction upon landing. It is again noted that this breakaway force is relatively small and provides for an unusually soft landing. When the aircraft makes a relatively hard touchdown, both chambers are compressed and the strut retracts to a point on line A where both chambers are compressed.

The advantages of this invention over the prior art can readily be seen. For example, were a single gas chambered strut placed under the same pressure as chamber 37, its pressure curve would be a hyperbolic curve represented by line B and broken line C. As can be seen, the strut would have good landing qualities with the low breakaway point; however, line C, which represents the strut during takeoff, is nearly vertical. Therefore, during takeoff, a strut so constructed would be very rigid and nonresponsive to the changes in chamber pressure and poor takeoff and taxiing characteristic would be undesirable for either passenger or cargo service.

In contradistinction, if a single gas chamber strut were under a very high pressure, for example the combined pressures of chambers 36 and 37, its pressure curve would be a hyperbolic curve represented by line A and broken line D. Here the strut would have good takeoff qualities; however, its landing characteristics, as represented by line D, would be poor. First of all, the breakaway force as represented by point F would be relatively high, resulting in hard landing characteristics, this despite the fact that the aircraft alighted softly. Secondly, upon landing, the taxiing characteristics would be undesirably rough because of the flatness of curve D.

Therefore, it can be seen that the landing gear of this invention utilizes the best parts of both curves to provide good strut characteristics throughout takeoff, landing and taxiing operations.

Figure 3:
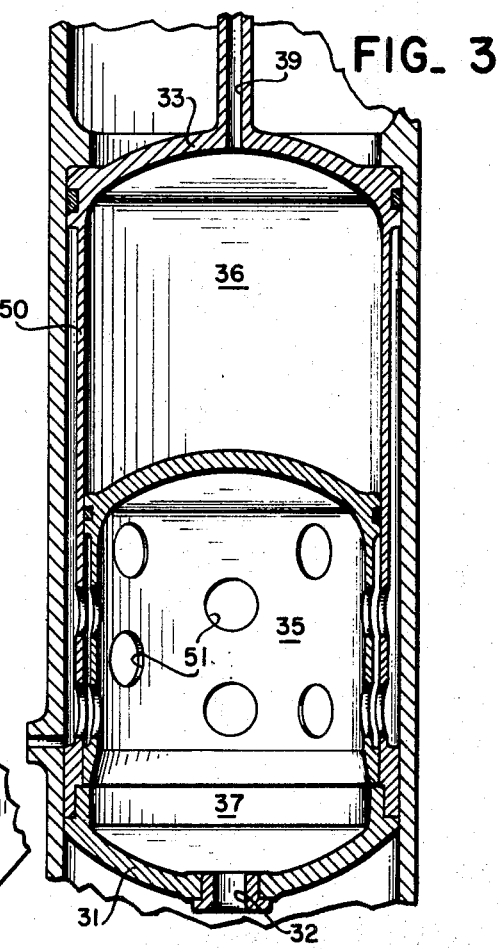
FIG. 3 is a sectional view of a modification of the dual air chambers.

FIG. 3 shows a modification of the pressure chamber 30, including the addition of a fixed sleeve 50 which abuts the lower end member 31 and integrally forms the upper end member 33. The sleeve 50 consists of the same material as the piston 35, while the cylinder 10 is usually made of an unlike and stronger material, since the stresses on the cylinder 10 are greater. The advantage of having the piston and cylinder being made of the same material is that the wear on both members is even and undue scoring is thereby prevented.

Finally, FIG. 4 shows a schematic diagram of an aircraft land gear system wherein three or more landing gears in accordance with the invention are manifolded together to equalize the pressure in each of the gears' upper air chambers. This is particularly advantageous under circumstances wherein the aircraft encounters runways or taxi strips having crowned pavements. Under such conditions the struts are sometimes required to be extended at different lengths. If the gears' pressure chambers were not manifolded, unequal reaction forces would be developed in the different gears. However, because of the manifolded gas pressure, the reaction forces of the gears are equal whereby the aircraft loads are evenly distributed to each of the gears.

The landing gear system includes a plurality of gears 10, each gear in communication with a manifold 60 through a line 61. The manifold 60, in turn, is in communication to a gas pressure source 63 via line 65.

It will be understood that various changes in the details, materials, steps and arrangements of parts, which have been herein described and illustrated in order to explain the nature of the invention, may be made by those skilled in the art within the principle and scope of the invention.

I claim:
1. A dual air chambered shock strut assembly for an aircraft comprising in combination:
   a vertical hollow cylinder having a closed upper end and an open lower end, the closed upper end adapted to be connected to the aircraft structure;
   a first piston having a working end extending into and reciprocably sealing the lower open end of the cylinder and being axially movable therein, the other end of the piston adapted to be connected to an aircraft wheel;
   a floating piston located in the cylinder and axially movable therein and separating the cylinder interior into an upper gas-containing pressure chamber and a lower gas-and-oil containing pressure chamber; and
   a fixed member having a restrictive orifice therein secured to said cylinder intermediate the lower gas-and-oil containing pressure chamber, whereby oil is forced through said restrictive orifice upon the shocking stroke of the assembly to dissipate impact energy.

2. A landing gear assembly comprising in combination:
   first and second telescoping members cooperating to define a cavity therebetween;
   pressure responsive means in one of the members reciprocably separating the cavity into a lower pressure chamber containing liquid and gaseous materials and an upper pressure chamber containing only a gaseous material; and
   a fixed member having a restrictive orifice therein secured to said one of the members intermediate said lower pressure chamber, whereby the liquid material is forced through said restrictive orifice into the portion of the lower pressure chamber bounded by said pressure responsive means and fixed member to dissipate impact energy of the shocking stroke.

3. A dual gas-chambered shock strut assembly for an aircraft comprising in combination: an elongated hollow cylinder having an open
   an elongated hollow cylinder having an open end and a closed end;
   strut means slidably disposed at said open end of said cylinder and including a slidable piston head;
   a fixed member including a restricting orifice mounted in said cylinder;
   an oil-and-gas containing chamber disposed in said cylinder and formed between said piston head and fixed member;
   a floating piston slidably disposed in said cylinder, said floating piston disposed between said fixed member and closed end of said cylinder;
   an upper gas chamber disposed between said closed end and floating piston;

a lower gas chamber disposed between said fixed member and floating piston;

the lower gas chamber at a pressure less than the pressure in the upper gas chamber;

said oil-and-gas and lower gas chambers directly communicating with each other through said restricting orifice; and the oil flowing through said restricting orifice into the lower gas chamber upon an impact stroke to absorb energy generated in the lower gas chamber.

4. The assembly of claim 3 including a liner mounted in said cylinder about said fixed member, said floating piston being slidably disposed in said liner.